INVENTOR
LESLIE ARTHUR HOPKINS
BY Cameron, Kerkam & Sutton
ATTORNEYS

United States Patent Office 3,399,744
Patented Sept. 3, 1968

3,399,744
AIR CUSHION SUPPORTED VEHICLES WITH DISTRIBUTING DUCT WITHIN THE CUSHION SPACE
Leslie Arthur Hopkins, Dibden Purlieu, England, assignor to Hovercraft Development Limited, London, England, a British company
Filed Apr. 18, 1966, Ser. No. 543,306
Claims priority, application Great Britain, Apr. 21, 1965, 16,878/65
6 Claims. (Cl. 180—128)

ABSTRACT OF THE DISCLOSURE

The space occupied by the vehicle-supporting cushion of an air cushion vehicle is supplied with pressurised air from a flexible duct disposed within the cushion space itself so as to avoid the occupation of useful space in the passenger or cargo compartments of the vehicle. The duct is disposed outwardly of a peripheral portion of the vehicle body and is bounded by a cushion-containing flexible skirt attached to and extending outwardly from said peripheral portion. The duct may be of porous material, and the porosity thereof may vary along the length of the duct so that air can be distributed to different regions of the cushion space at differing rates.

---

Figure 1:
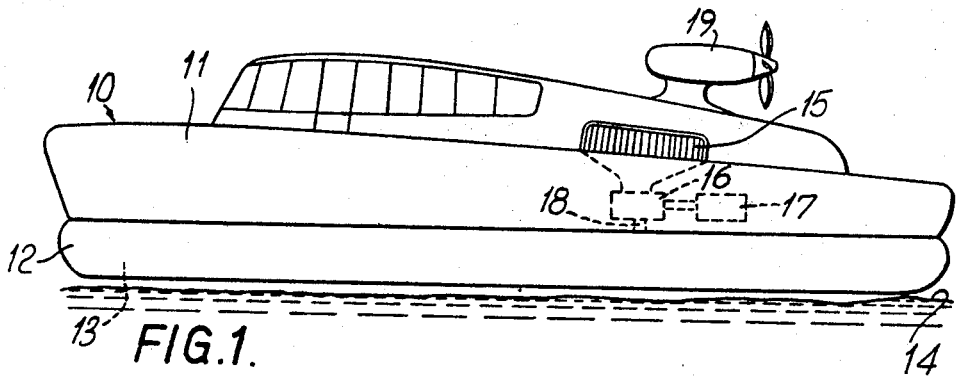

The present invention relates to gas cushion vehicles; that is to say, vehicles for travelling over surfaces which, in operation, are supported by at least one cushion of pressurized gas formed and maintained between the body of the vehicle and the surface.

In one known form of gas cushion vehicle, the pressurised gas of the gas cushion is laterally confined beneath the vehicle body at least in part by a wall structure depending from the vehicle body. This wall structure may be of rigid and/or flexible material and may incorporate one or more parts from which pressurised gas is downwardly discharged in the form of a curtain which laterally bounds the cushion below the wall structure and which may supply some or all of the gas in the gas cushion. Any suitable gas may be utilized to form the cushion and most commonly the gas is air which is drawn through an intake on the body to a suitable pump or compressor where it is pressurised and thereafter discharged to the cushion space.

Pressurized gas must be continuously supplied to the cushion space during the operation of the vehicle and in accordance with the design of the gas cushion vehicle, it may be required to distribute the gas uniformly to all regions of the cushion space or it may be required to supply the gas nonuniformly; for instance, it may be required to supply more gas to the front region of the cushion space than elsewhere to maintain the stability of the vehicle.

To provide for distribution of gas to the cushion, past proposals have arranged that the pump or compressor feeds its pressurised gas to ducting incorporated in the body of the vehicle around the bottom periphery thereof, the ducting having one or more apertures through which gas is directed into the cushion space.

Arrangements of this type have the disadvantages that the ducting, which must be capable of handling large volumes of gas, takes up much space in the body (10% of the overall volume of the body is a typical figure) which could be put to other uses, such as a passenger or freight carrying, and that leakage of gas from the ducting into the body must be prevented by adequate gas-sealing of the ducting.

The present invention seeks to provide an improved gas cushion vehicle and, according to the invention, there is provided a gas cushion vehicle having a body, a wall structure depending from the body and serving, in operation, to bound laterally a space beneath the body in which a cushion of pressurised gas is formed and maintained, and a duct formed from flexible sheet material disposed within said space for supplying and distributing at least some of the cushion-forming pressurised gas to said space.

Since the duct is within the cushion space, the useful volume of the body is increased, sealing of the duct against gas leakage need not be perfect, and because the pressure difference across the walls of the duct would be very small, the walls of the duct can be made of very lightweight materials. Furthermore, although the duct is disposed within the space enclosed by the wall structure, it is protected to a large extent by the wall structure.

The duct may be in the form of a closed figure, such as a ring, and may be substantially parallel to the periphery of the bottom of the vehicle body, and the material hereof may be porous so that gas can pass from the interior of the duct to the said space through the material of the duct.

In one form of the vehicle according to the invention, the flexible sheet material of the duct is uniformly porous so that the gas is distributed substantially uniformly from from the duct to the space. In another form, the flexible material of the duct has regions of differing porosity, so that in operation, gas is distributed to the said space at a greater relative rate from regions of high porosity and at a lower relative rate from regions of lower porosity. In a further form, the duct may be arranged for supplying pressurised gas to at least one downwardly directed nozzle incorporated in the wall structure, the nozzle, in operation, discharging the gas downwardly in the form of a curtain which laterally contains that part of the cushion below the wall level of the structure and which supplies at least some pressurised gas to the said space for the gas cushion. In this latter form, the material of the duct may be either substantially nonporous, in which event the interior of the duct communicates with the nozzle through at least one aperture therein whereby, in operation, substantially all of the pressurised gas in the duct passes to the said nozzle, or it may be porous so that some gas in the duct passes to the said nozzle and some gas passes through the material of the duct directly to the cushion space.

The duct may be mounted outwardly of the vehicle body and the wall structure may at least partly surround the duct, and in one construction, the periphery of the bottom of the vehicle body is chamfered and the duct is accommodated between the chamfered periphery and the wall structure.

The vehicle body may also have at least one port formed in the bottom thereof for supplying pressurised gas directly to the space for the gas cushion.

Figure 2:
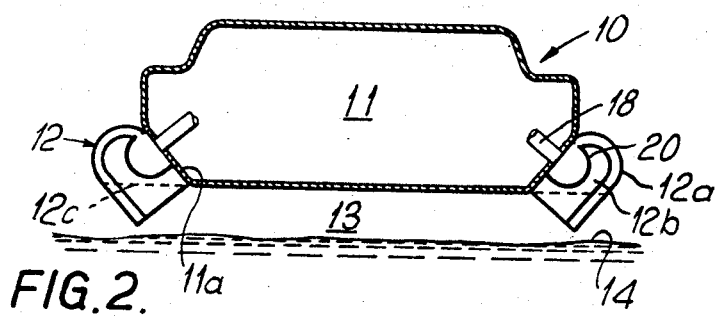
Figure 3:
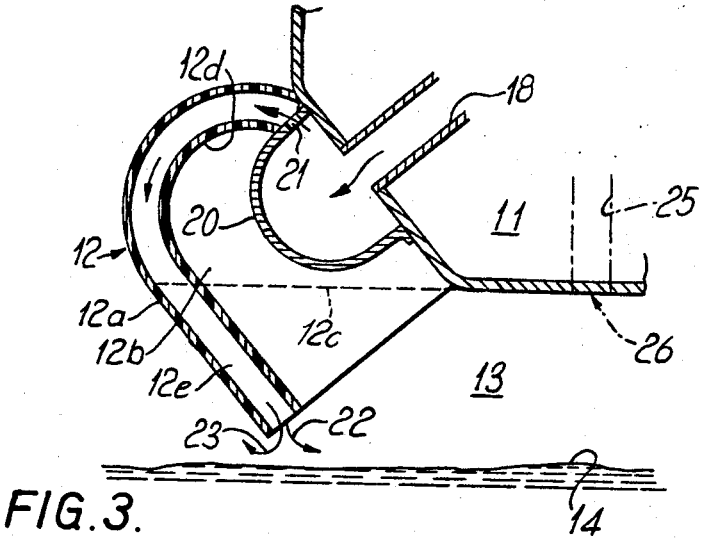

Embodiments of the invention, given by way of non-limitative example, will now be described with reference to the accompanying drawings in which:

FIGURE 1 is a side elevation of the vehicle in accordance with the invention, during operation of the vehicle, FIGURE 2 is a schematic cross-section of the vehicle of FIGURE 1 showing the principal features relating to the invention, and FIGURE 3 is a schematic cross-section corresponding to the left-hand lower peripheral region of the vehicle of FIGURE 2 but showing another arrangement in accordance with the invention, to a larger scale.

In FIGURE 1, the vehicle, generally indicated by reference 10, comprises a body 11 from which depends a wall structure 12 serving to laterally bound a space 13 beneath the body 11 in which a cushion of pressurised gas is formed and maintained for supporting the vehicle 10 above surface 14 over which the vehicle is to travel. In this embodiment, the pressurised gas is air which is drawn into body 11 through an intake 15 by a compressor or pump 16 which is driven by a motor 17. The air is pressurised by pump 16 and passed through one or more conduits 18 to the cushion space 13. The vehicle 10 can be propelled over surface 14 by the air-screw propeller unit 19.

Referring now to FIGURE 2, two conduits 18 can be seen, although it is to be understood that any number of conduits 18 from one upwards may be provided. The conduits 18 discharge pressurised air from the pump 16 into a duct 20 formed from flexible sheet material, and which is disposed beneath the body 11 in the space 13 for the air cushion. The duct 20 is in the form of a closed or endless figure attached to a chamfered peripheral portion 11a of the bottom of the body 11 so as to be more or less parallel to the outline of the chamfered peripheral portion 11a. The flexible sheet material of duct 20 may be for example, of rubberised fabric, or plastics or similar flexible sheet material, and is sufficiently porous to enable the pressurised air to escape therethrough from the interior of the duct 20 to space 13 without suffering a large pressure drop, although it will be appreciated that the porosity should be sufficiently small to have a throttling effect on air passing therethrough so that the required discharge of air to space 13 takes place substantially uniformly throughout the length of duct 20. Those skilled in the art will be aware of flexible sheet materials suitable for the construction of the duct 20 and able to meet the envisaged performance characteristics for satisfactory operation of the vehicle 10. The duct 20 may be attached to any part of the body 11 so as to be within the cushion space 13, but it is preferred to attach the duct to the mitred peripheral portion 11a so that when the vehicle 10 is not operational, the body 11 will not rest on the duct 20 and damage the material thereof.

The wall structure 12 comprises an outer wall 12a formed from a flexible material, such as rubber sheet or rubberised fabric or similar flexible sheet, which, as shown, is attached to and extends outwardly from the chamfered peripheral portion 11a of the vehicle body 11, and it will be seen that during operation of the vehicle, the wall structure 12 is inflated by the pressure of the gas cushion to a form which is generally initially outwards from body 11, then downwards and then inwards, generally in a smooth curve surrounding the duct 20. Wall structures incorporating an outer wall of this general form are described and claimed in Patent No. 3,362,500. In order to lend stability to the configuration of outer wall 12a, the wall structure 12 may also comprise, if desired, a number of peripherally spaced, flexible sheet septa 12b, the lower edges of which are indicated by 12c, which are fastened to the body 11 at their inner edges and to the outer wall 12a at their outer edges. At option, the inner edge of each septum 12b may be shaped to accommodate duct 20 or may pass right across duct 20. As an alternative (not shown) to the septa 12b, the inflated configuration of wall 12a may be stabilised by cords fastened between the body 11 and outer wall 12a.

FIGURE 3 shows a wall structure similar to that of FIGURE 2, but adapted for the production of a fluid curtain. Parts which appear in FIGURES 2 and 3 are given the same reference numerals. It will be seen that pressurised air is discharged from conduit 18 to duct 20, as previously mentioned. Duct 20 is formed, as before, from rubber, rubberised fabric or like flexible material (rubber-proofed fabric weighing five ounces per square yard is found to be satisfactory) and may be porous to air or non-porous as desired for this embodiment. The wall structure 12 comprises an outer wall 12a and an inner wall 12d spaced therefrom, the gap therebetween forming a passage 12e. Duct 20 has a number of peripherally spaced apart apertures 21 in the wall thereof, which may conveniently be eyeletted apertures, which are positioned to allow a more or less free discharge of pressurised air from duct 20 into passage 12e.

The passage 12e acts as a nozzle which directs a curtain of the pressurised air downwardly towards surface 14 and somewhat inwardly towards space 13, the curtain laterally containing the pressurised air in the space 13. The curtain of air splits on contact with the surface 14 and some of the air in the curtain, indicated by arrow 22, passes into the cushion space 13, and serves to replenish any loss of air from the cushion, the remainder moving outwardly from the cushion space 13, as indicated by arrow 23. Leakage through the walls of duct 20 directly to space 13 is unimportant provided that the air-curtain is sufficiently maintained, therefore, the sealing of duct 20 against leaks need not be elaborate. It is contemplated that additional air may be supplied directly to the cushion space 13 from pump 16 through a conduit 25, shown in dotted lines in FIGURE 3, terminating in a port 26 open to the cushion space 13. It is further contemplated that the flexible sheet material of duct 20 may be sufficiently porous to permit some pressurised air to pass directly to the cushion space 13 while the remainder discharges through the apertures 21 into the passage 12e, and that the porosity of the material of the duct 20 may vary from place to place so that certain regions of the cushion space 13 are supplied with air from the duct 20 at a greater relative rate from the regions of high porosity and at a lower rate from the regions of lower porosity. This varying porosity may be achieved by the use of proofed fabric which has been apertured to varying degrees in different places or by the use of proofed and unproofed material at different places.

As in the previous embodiment, a number of peripherally spaced septa 12b may be provided to stabilise the shape of the wall structure 12, and these may extend from the outer wall 12a to the body 11 in any of the forms previously mentioned.

Although the duct 20 described above is in the form of a closed figure of somewhat toroidal shape, the invention includes gas cushion vehicles in which the duct 20 takes other forms: for example, the duct 20 may be substantially rectilinear and extend under the front periphery of the vehicle body 11, the ends being closed by suitable end caps of flexible material.

It is to be understood that the invention is not limited to a vehicle having wall structures 12 as described above, but is also applicable, for example, to vehicles of the type described in which the wall structure is formed from a number of portions (not shown) which are substantially U-shaped in horizontal section with the free ends of the limbs of the U-shaped portions disposed in the cushion space and with the adjacent limbs of successive of these portions in abutment when the portions are subjected to the pressure of gas in the cushion space, thereby to seal gaps between the portions. Such a wall structure is described and claimed in the co-pending commonly owned, application of Denys Stanley Bliss, Ser. No. 267,695, filed Mar. 25, 1963, now abandoned, and the continuation-in-part thereof, Ser. No. 566,948, filed July 21, 1966. The duct 20 in such a case could either traverse the limbs of the U-shaped portions, or be attached to the body 11 inwardly of said portions.

Furthermore, although in the illustrated embodiments, the vehicle body 11 has a chamfered lower periphery to which the duct 20 is attached, it is to be understood that the invention includes vehicles having nonchamfered bodies, and vehicles in which the duct 20 is attached to the bottom of the vehicle body inwardly of the periphery thereof.

The features described above may be arranged in various combinations without departing from the invention as defined by the appended claims.

I claim:

1. A gas cushion vehicle having a body, pressurised gas supply means, a flexible wall structure depending from the body and serving, in operation, to bound laterally a space beneath the body in which a cushion of pressurised gas is formed and maintained, and a duct separate from said wall structure and formed from flexible sheet material disposed within said space for supplying and distributing at least some of the cushion-forming pressurised gas from said supply means to said space, the material of the duct being porous so that gas can pass from within the duct to the said space, and having regions of differing porosity so that, in operation, gas is distributed to the said space at a greater relative rate from regions of high porosity and at a lower relative rate from regions of lower porosity.

2. A gas cushion vehicle having a body, pressurised gas supply means, a flexible wall structure depending from the body and serving, in operation, to bound laterally a space beneath the body in which a cushion of pressurised gas is formed and maintained, and a duct separate from said wall structure and formed from flexible sheet material disposed within said space for supplying and distributing at least some of the cushion-forming pressurised gas from said supply means to said space, the wall structure including at least one downwardly directed nozzle and the duct being arranged for supplying pressurised gas to said nozzle whereby, in operation, the nozzle downwardly discharges the gas in the form of a curtain which laterally contains that part of the cushion below the level of the wall structure and which supplies at least some pressurised gas to the said space.

3. A vehicle according to claim 2 in which the material of the duct is substantially non-porous and is provided with at least one aperture providing a passage for gas from the duct to said nozzle whereby, in operation substantially all of the pressurised gas in the duct passes to the said nozzle.

4. A vehicle according to claim 2 in which the material of said duct is porous whereby, in operation, some gas in the duct passes to said nozzle and some gas passes directly from within the duct to the said space.

5. A gas cushion vehicle having a body, pressurised gas supply means, a flexible wall structure mounted on and depending from the body and serving, in operation, to bound laterally a space beneath the body in which a cushion of pressurised gas is formed and maintained, and a duct separate from said wall structure and formed from flexible sheet material disposed within said space for supplying and distributing at least some of the cushion-forming pressurised gas from said supply means to said space, the duct being disposed outwardly of a peripheral portion of the vehicle body, and the wall structure being attached to and extending outwardly from said peripheral portion so as to at least partly surround the duct.

6. A gas cushion vehicle having a body, pressurised gas supply means, a flexible wall structure mounted on and depending from the body and serving, in operation, to bound laterally a space beneath the body in which a cushion of pressurised gas is formed and maintained, and a duct separate from said wall structure and formed from flexible sheet material disposed within said space outwardly of a peripheral portion of said body and at least partly surrounded by said wall structure for supplying and distribtuing at least some of the cushion-forming pressurised gas from said supply means to said space, the body having a chamfered lower periphery and said duct being accommodated between the chamfered lower periphery and said wall structure.

References Cited

UNITED STATES PATENTS

| 3,182,627 | 5/1965 | Rethorst | 180—7 |
| 3,208,543 | 9/1965 | Crowley | 180—7 |
| 3,247,921 | 4/1966 | Latimer-Needham et al. | 180—7 |

A. HARRY LEVY, *Primary Examiner.*